E. R. STILWELL.

Water-Heating Device.

No. 6,286. Reissued Feb. 9, 1875.

Witness

Edw. J. Sils

R. H. Whitlesey

Inventor.

Edwin R. Stilwell

By F. Millward

Attorney

UNITED STATES PATENT OFFICE.

EDWIN R. STILWELL, OF DAYTON, OHIO, ASSIGNOR, BY MESNE ASSIGNMENTS, TO STILWELL AND BIERCE MANUFACTURING COMPANY.

IMPROVEMENT IN WATER-HEATING DEVICES.

Specification forming part of Letters Patent No. 93,244, dated August 3, 1869; reissue No 6,286, dated February 9, 1875; application filed January 23, 1875.

*To all whom it may concern:*

Be it known that I, EDWIN R. STILWELL, of Dayton, in the county of Montgomery and State of Ohio, have invented a new and Improved Apparatus for Heating, Condensing, and Purifying Feed-Water for Steam-Boilers; and I do hereby declare that the following is a full, clear, and exact description thereof, reference being had to the accompanying drawings making a part of this specification.

This invention relates to certain improvements in apparatus and process of heating and purifying feed-water for boilers, and is an improvement over the method described in the reissued Letters Patent No. 3,618, granted E. R. Stilwell August 24, 1869.

The purification of the water is effected, as shown in that patent, by subjecting the water to the action of steam while passing over a series of shelves, causing the deposit of the larger portion of crystallizable salts upon the shelves, and, by the heat imparted to the water, to cause a ready separation of the impurities which do not crystallize upon the shelves by passing the water through a filter, removing the floating and mechanical impurities.

The improvements herein described are, first, in improving the process of purification by causing the water to pass from the shelves into a sediment-chamber, where the heavier class of impurities will separate and settle by gravity to the bottom of the chamber, and from this chamber through a filter-chamber filled with suitable material for removing the remaining impurities. My invention consists, secondly, of the combination of the heating-shelves and sediment-chamber with an upward filter, through which the water is made to flow upwardly instead of downwardly; and thirdly, in such an arrangement of these elements as that, in the order of succession of operation in the passage of the water, the sediment-chamber or mud-well is located between the series of shelves and the upward-filtering chamber. My invention consists, fourthly, in arranging the shelves within the heater in sections, for convenient access into the interior of the heater. My invention consists, fifthly, in the method of securing the man-hole door by the employment of adjustable rabbeted bars, which will allow the door to be removed and replaced without removing the bars.

Figure 1:
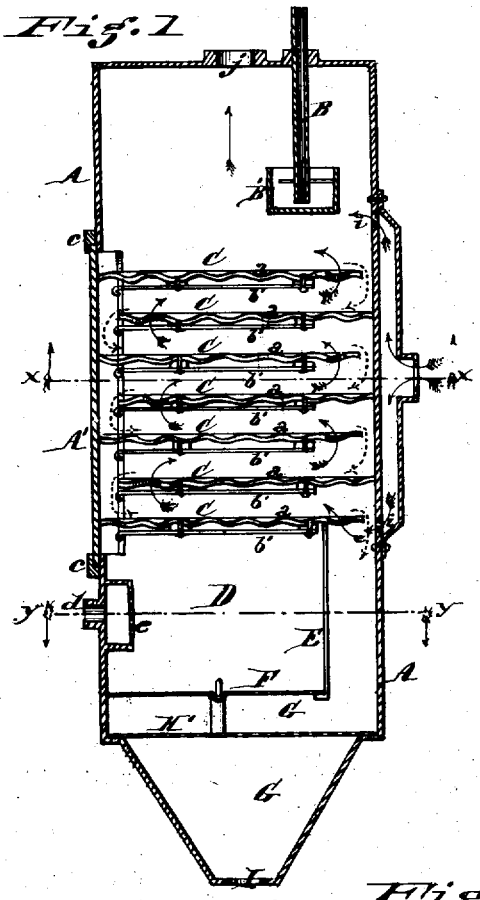
Figure 2:
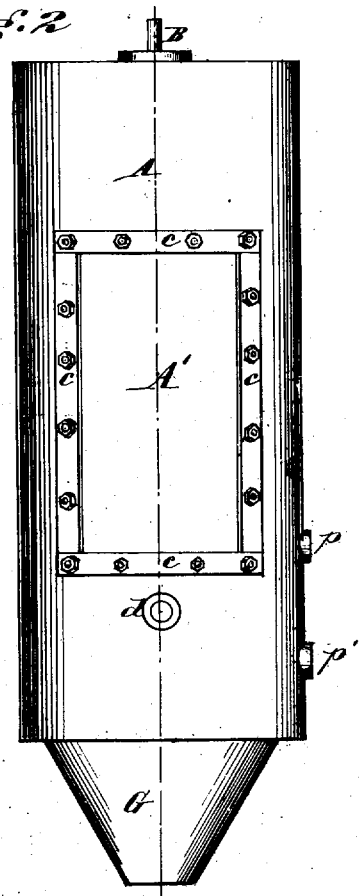
Figure 3:
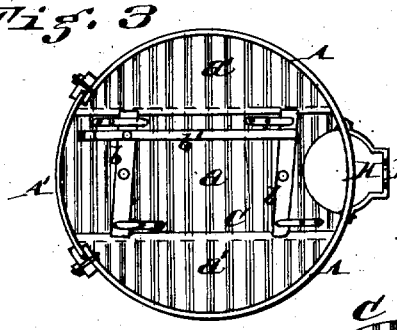
Figure 4:
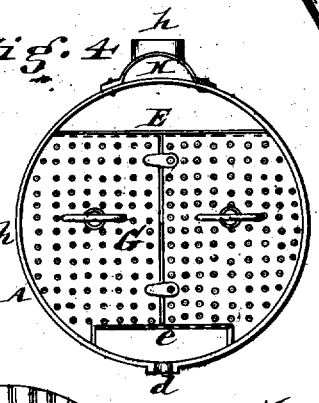
Figure 5:
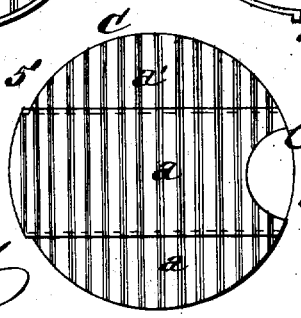

Figure 1 is a section taken diametrically through the improved apparatus. Fig. 2 is a front view of the apparatus. Fig. 3 is a section taken through Fig. 1 in the horizontal plane indicated by line *x x*, looking upward. Fig. 4 is a section through Fig. 1, taken in the horizontal plane indicated by line *y y*, looking downward. Fig. 5 is a top view of one of the shelves with its removable section.

Similar letters of reference indicate corresponding parts in the several figures.

In the accompanying drawings, A represents the shell of the heater and filter, which may be constructed cylindrical, elliptical, rectangular, or of any other form, and which may be made of iron and other suitable material. B represents the induction water-pipe, leading into case A through its top, and terminating, at its inner end, in an overflow-box, B′. The shelves C, over which the water is caused to flow, are arranged one above another, at proper distances apart, and have openings at their ends, through which the water passes from one shelf to another, as described in my Letters Patent above referred to. Each shelf consists of a central removable section, *a*, and two segmental or side sections, *a′ a′*, as shown in Figs. 3 and 5. The side sections *a′ a′* are permanently attached to the shell, but the intermediate section *a* is made so that it can be removed or replaced at pleasure.

The object of having a portion, *a*, of each shelf removable is that free access may be had to the interior of shell A when the door A′ is removed.

The sections *a* may each be secured in place by means of pivoted bars *b b*, to which a rod, *b′*, is pivoted for working these bars.

The sections *a* are made wide enough to lap over the fixed sections, so that when the pivoted bars *b b* are turned, as shown in Fig. 3, their ends will pass beneath the edges of the fixed sections, and thus hold the movable sections in place.

I prefer to corrugate the shelves as shown in Figs. 1, 3, and 5, for the purpose of having them present a very large amount of surface in a comparatively small superficial area.

The door A′, which is applied to the shell A, for the purpose of closing the opening leading therein, is held in place tightly by means of rabbeted bars *c c c c*, which are secured to the shell by means of bolts and nuts.

The bolts pass through oblong holes made through the said bars, so that by loosening the nuts the bars can be moved back far enough to free the edges of the door A′, thereby allowing this door to be removed. The sediment-chamber G is preferably located beneath the filter-chamber D, the respective areas of which should nearly correspond to that of the heater in the proportions I have shown. E represents a vertical division-plate extending from the bottom shelf down to the sediment-chamber. Above the sediment-chamber is a perforated plate, F, for allowing the water to pass from the sediment-chamber into the filter-chamber, and when an upward filter is used in connection with the sediment-chamber it is perferable to have this plate F of the same area as the filter-chamber, as the current into it will be slower and the heavier particles will more readily settle in the sediment-chamber. H′ represents a strainer, which separates the sediment-chamber into two compartments. Its chief utility is to prevent large pieces of deposits on the shelves, which become occasionally disengaged, from falling into the bottom of the sediment-chamber and stopping up the blow-off hole at the bottom of the sediment-chamber. This plate H′ is an important feature of my device. The sediment which settles in the sediment-chamber may be drawn or blown out through the port I.

I have shown this lower portion of this sediment-chamber in a conical form, as this form facilitates the blowing off, but it is obvious that it performs its office as a sediment-collector irrespective of its form.

The upper orifice, *i*, is arranged so that the inflowing steam strikes the stream of water falling from the overflow-vessel B′ upon the first shelf, C, of the series of shelves, and the lower orifice, *i*, is arranged so that the inflowing steam will strike the stream of water falling from the last shelf of the series. The steam which enters the shell A through the lower orifice, *i*, is more or less condensed, and that which is not condensed escapes through an orifice, *j*, at the top of shell A.

The operation is as follows: The feed-water enters the apparatus through pipe B, falls from box B′ upon the upper shelf, C, and passes to and fro over the shelves successively, in the manner indicated by curved dotted lines in Fig. 1. The steam is admitted through pipe *h* into chamber H, and enters the shell at the two points *i i*. That portion of the steam which enters at the lower point, *i*, passes up between the shelves in an opposite direction to the flow of the water. The descending water, as it flows over and falls from one shelf to another, is met by the ascending steam and most thoroughly heated, and thereby deprived of the larger portion of its foreign crystallizable elements which are deposited on the shelves C C C. That portion of the steam which is not condensed escapes from the shell at *j*. After the water flows over the lower shelf it descends into the sediment-chamber G, where it is deprived of the mechanical elements, which will readily settle of their own gravity, and thence it passes upwardly into the filter-chamber, through the filtering material therein, which deprives the water of the lighter floating impurities not removed by the shelves, and in the sediment-chamber, leaving the purified water to pass through the orifice *d* for use.

Having described my invention, what I claim as new, and desire to secure by Letters Patent, is—

1. A heater and feed-water purifier, composed substantially of a series of heating and depositing shelves, a sediment-collecting chamber, and a filter-chamber, arranged in such relation to each other that the water is first passed in thin streams over the shelves for heating by steam for the deposit of crystallizable salts, thence into a sediment-chamber, where the heavier elements settle, and from which it passes through filtering material in a filter-chamber, where the lighter and remaining separable impurities are removed, substantially as herein set forth.

2. The sediment-chamber or mud-receptacle G, in combination with a series of shelves, C, and the upward filter-chamber D, substantially as herein set forth.

3. In combination with a feed-water heater and purifier, which contains a series of shelves, a sediment-chamber, located in the order of operation between the shelves and a filter-chamber, the filter-chamber so constructed that the water must flow upwardly through the filtering material, substantially as herein described.

4. In combination with case A the shelves C, constructed and arranged in sections substantially as and for the purpose specified.

5. The door A′ applied to shell A by means of the adjustable bars *c c* and bolts and nuts, substantially as described.

EDWIN R. STILWELL.

Witnesses:
EDWARD BOYD,
JOHN O'GARA.